No. 651,277. Patented June 5, 1900.
P. SMITH.
BICYCLE SEAT SUPPORT.
(Application filed July 29, 1899.)
(No Model.)
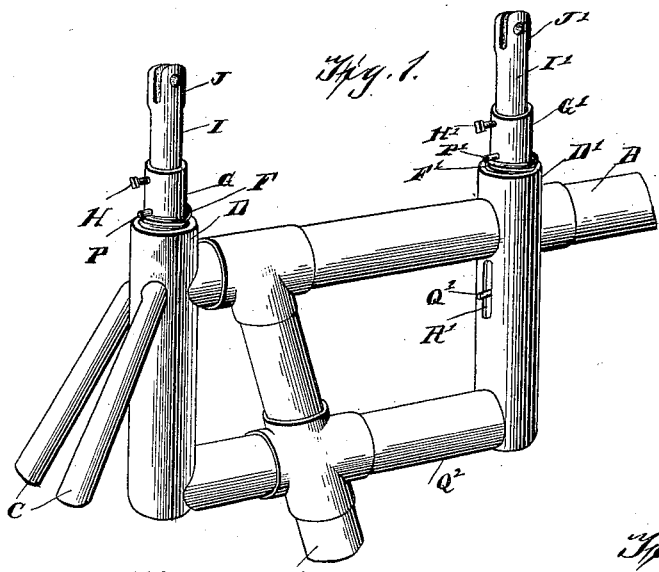
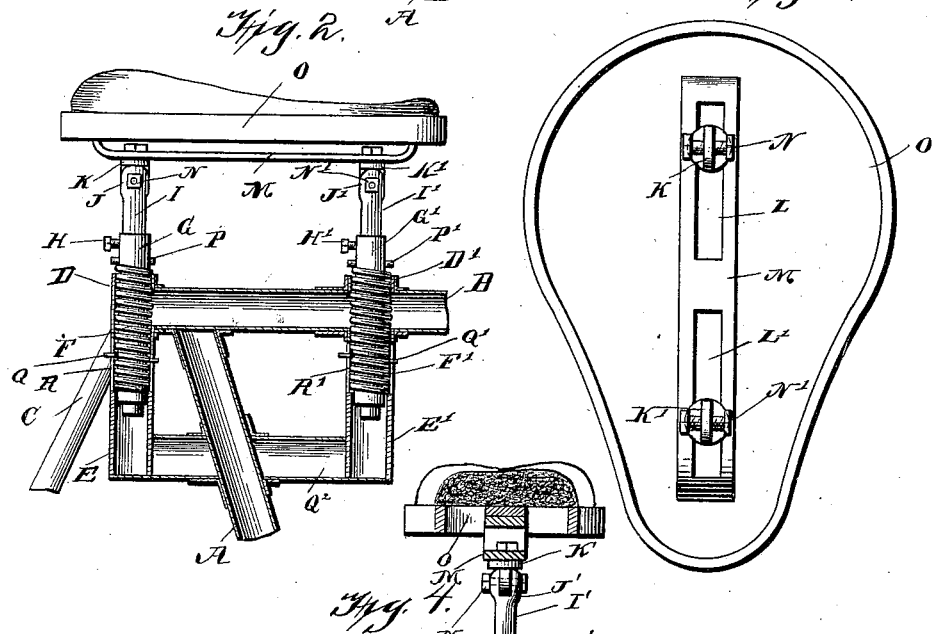
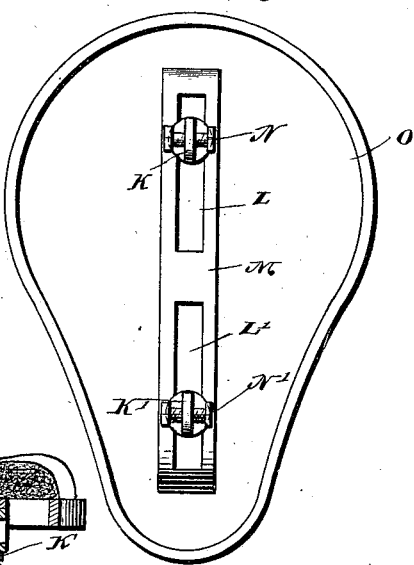
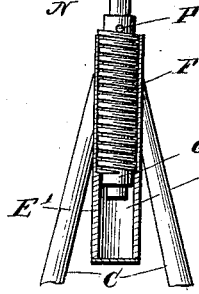
Witnesses
Inventor
Peter Smith.
Attorneys

UNITED STATES PATENT OFFICE.

PETER SMITH, OF RIVERSIDE, ILLINOIS.

BICYCLE SEAT-SUPPORT.

SPECIFICATION forming part of Letters Patent No. 651,277, dated June 5, 1900.

Application filed July 29, 1899. Serial No. 725,504. (No model.)

*To all whom it may concern:*

Be it known that I, PETER SMITH, a citizen of the United States, residing at Riverside, in the county of Cook and State of Illinois, have invented a new and useful Bicycle Seat-Support, of which the following is a specification.

My invention relates to bicycles or other vehicles provided with saddle-seats; and the object of the invention is to provide a new and improved support for such seats which, while of simple and economical construction, will be durable and comfortable and by virtue of its improved construction capable of a large number of adjustments to suit the fancy or increase the ease and comfort of the rider.

With this object in view my invention consists in the improved construction, arrangement, and combination of parts hereinafter fully described and afterward specifically pointed out in the appended claims.

In order to enable others skilled in the art to which my invention most nearly relates to make and use the same, I will now proceed to describe its construction and operation, reference being had to the accompanying drawings, forming part hereof, in which—

Figure 1 is a perspective view of a small portion of the frame of a bicycle with my improved seat-support applied thereto. Fig. 2 is a longitudinal vertical sectional view of the same parts. Fig. 3 is a bottom plan view of the seat detached. Fig. 4 is a transverse vertical sectional view through the front end of the seat.

Like letters of reference mark the same parts wherever they appear in the several figures of the drawings.

Referring to the drawings by letters, A indicates the seat-post, B the top bar, and C the rear forks, of a frame of a bicycle of any ordinary construction. The seat-post and rear forks are unaltered; but the top bar is constructed in any suitable manner or form to provide two vertical openings for the passage of two upright tubes D D', the lower ends of which are thickened or reinforced, as at E E', to form a rest for the lower ends of two springs F F', coiled around two tubes G G', in which are secured, by means of set-screws H H', two rods I I', upon which the seat is supported. These rods have bifurcated heads J J' at their upper ends, which are pivotally secured to slide-blocks K K', which are seated between the branches of the bifurcated heads J J' and attached thereto by screws, bolts, or rivets N N'. The slide-blocks project through slots L L' in a metal plate M and are each provided with a shoulder and a nut, between which the bar is held. The plate M is secured to the under side of the saddle or seat O by any suitable means.

The springs F F' are coiled around the tubes G G', respectively, between the shoulders E E' and pins P P', and said pins P P' project from the sides of the tubes G G' and from the upper bearings of the springs. Other pins Q Q' project laterally from the sides of tubes G G' through slots R R' in the tubes D D' below the top bar and serve to limit the movement of tubes G G' below the top bar B, the springs supporting the seat yieldingly and the pins preventing the upward displacement of the tubes G G'.

When the parts are all assembled, as before described, the seat will be supported on the springs F F' at front and rear. Should it be desired to lower either end of the seat—as, for instance, the front end—the rod I' will be moved downward any desired distance in tube G' and secured by set-screw H'. The same adjustment at the rear will lower that end of the seat. When one end of the seat is raised or lowered, the seat will be inclined and the distance between the blocks K and K' increased. This movement is permitted by the provision of the sliding connection of said blocks with the seat in the slots L and L'. After the adjustment has been made the blocks are clamped to the bar by means of ordinary clamping-nuts.

The tubes D D' are steadied at their lower ends by a divided rod $Q^2$, the ends of which are secured thereto and to each side of the seat-post A.

The utility and advantages of my invention will be apparent from the foregoing, and the simplicity of the construction will be obvious.

While I have illustrated and described what I consider to be the best means now known to me for carrying out my invention, I do not wish to be understood as restricting myself to the exact forms of construction shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. A bicycle-seat provided with a longitudinally-slotted plate secured to its under surface, in combination with the frame of the machine having two vertical openings, blocks slidably seated in the slots of the seat-plate, vertical rods pivotally connected to said blocks, tubes around the rods, means for locking the rods within the tubes stops for limiting the vertical movement of the tubes and springs coiled around said tubes, the lower ends of which are supported within the frame of the bicycle, and pins in the tubes for engaging with the upper ends of the springs above the frame, substantially as described.

2. The combination with a frame of the bicycle having vertical openings, of the seat, the inner tubes each provided with stops, the rods secured therein and slidably pivoted to the seat, and working in the frame-openings, the springs coiled around the inner tubes the upper ends of which bear against said stops, the other tubes in the frame-openings around the springs and inner tubes, and the reinforcement of said outer tubes forming the lower bearings of the spring, substantially as described.

3. The combination with the top bar of the slotted outer tube secured therein and provided with shoulders, the inner tube and spring within the outer tube, the spring resting on the shoulders therein, the pins projecting from the inner tubes through the slots of the outer tubes, the pins in the inner tubes above the springs, the rods in the inner tubes, their set-screws, the seat and slidable pivotal connections between the rods and seat, substantially as described.

PETER SMITH.

Witnesses:
CHARLES C. SNYDER,
FRED. MALMSTROM.